Sept. 18, 1928.
A. A. ANDERSON
AIRCRAFT
Filed April 14, 1927
1,685,014
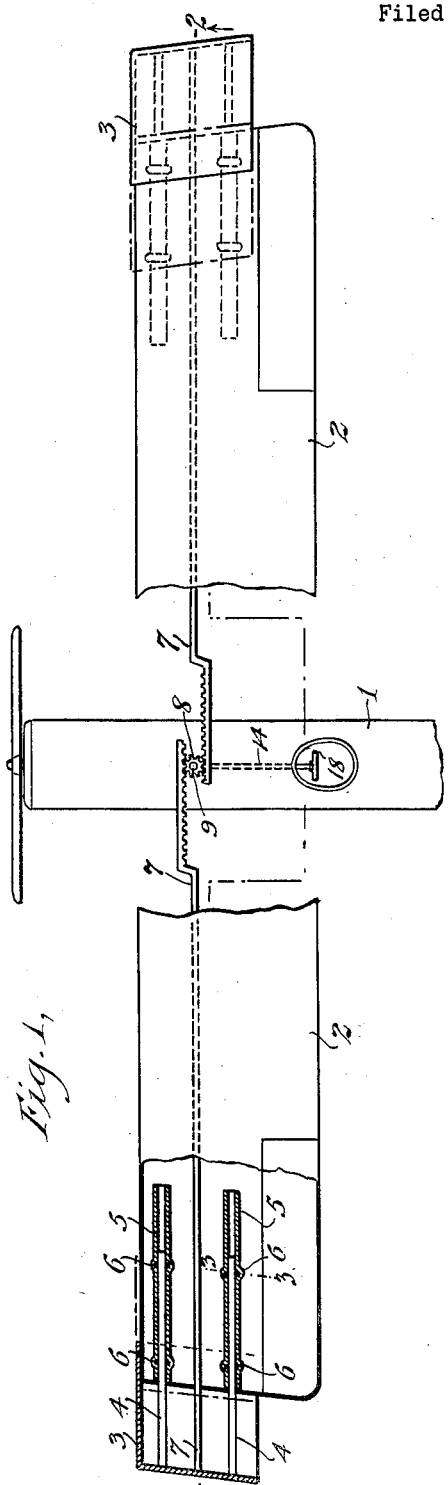
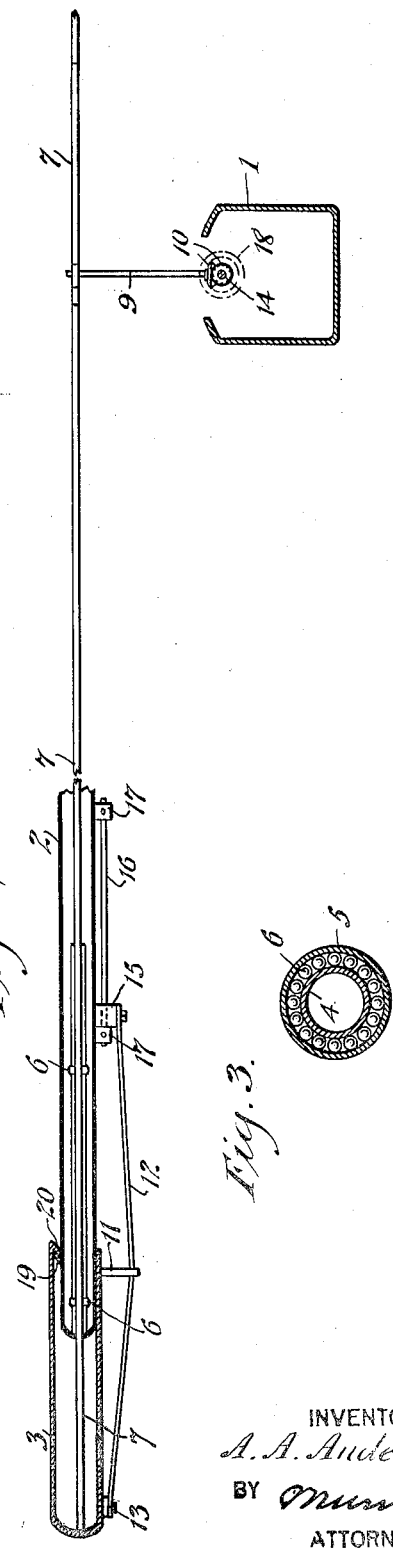
WITNESSES
INVENTOR
A. A. Anderson
BY
ATTORNEY Patented Sept. 18, 1928.

1,685,014

UNITED STATES PATENT OFFICE.

ABRAM A. ANDERSON, OF NEW YORK, N. Y.

AIRCRAFT.

Application filed April 14, 1927. Serial No. 183,782.

This invention relates to aircraft and more particularly to airplanes, an object of the invention being to provide means whereby the ends of the planes or wings can be extended and contracted.

In order that a quick take-off may be possible with airplanes it is advisable to have the planes or wings as long or as large as possible in order to secure a greater bearing or lifting action on the air, whereas in flight and in manipulation of the airplane in the air it is advisable that the area of the planes or wings be reduced, and I have provided means which are in the nature of extensions at the ends of the planes which can be projected and retracted by the operator in the fuselage of the airplane, and this operation can be easily carried out so that these extensions may be projected during the take-off and also during the landing and at any other time desired, and can be drawn inwardly or retracted at the will of the operator.

My invention is of course capable of a wide range of modification and I do not of course limit myself to the specific details of construction illustrated in the drawings and which shall be hereinafter described as it is to be distinctly understood that the drawings are for illustration only and show but one form of the device which may be employed.

With these and other objects in view, the invention consists in certain novel features of construction and combinations and arrangements of parts which will be more fully hereinafter described and pointed out in the claim.

In the accompanying drawings—

Figure 1 is a plan view, more or less diagrammatic, partly broken away and partly in section, illustrating my invention;

Figure 2 is a fragmentary view on an enlarged scale in section on the line 2—2 of Figure 1;

Figure 3 is an enlarged view in section on the line 3—3 of Figure 1.

1 represents the fuselage and 2, 2 the wings, which together constitute a plane, and while I have illustrated my invention in connection with aircraft of the monoplane type it is obvious that the device is adapted for any type of plane.

The end portions of the plane 2, 2 I shall refer to as "wings", and these wings 2, 2 have extensions 3 on their ends which can be moved outwardly and inwardly, as will be explained.

These extensions 3 are preferably hollow and telescope upon the ends of the wings, as illustrated clearly in Figure 2. The extensions 3 have parallel rods 4 fixed thereto, and these rods are mounted to move in guide sleeves 5, 5 fixed in the wings of the plane.

These guide sleeves 5, 5 are preferably formed with internal anti-friction bearings 6 so as to reduce the frictional contact of the rods and bearing sleeves to a minimum and facilitate the easy movement of the extensions.

The rear portions of the extensions 3 may be open but it is desirable that the front portions thereof be closed and rigid against the front edges of the wings, as clearly shown in Figure 1. The extensions may of course be moved inwardly and outwardly through the medium of any desired mechanism but I have illustrated a simple construction of operating and controlling means which includes rack bars 7 extending through the wings 2 and fixed to the extensions 3.

The inner ends of these rack bars are engaged by a pinion 8 on a vertical shaft 9, the latter connected by miter gears 10 with a shaft 14 of a fuselage on which a hand wheel 18 is fixed.

The extensions 3 are braced by posts 11 on the under portions thereof, and rods or analogous devices 12 at their intermediate portions engage these posts. The outer ends of the rods 12 are secured to the lower portions of the extensions, as shown at 13, and the inner portions of the rods are fixed to collars 15 which slide on rods 16.

The rods 16 are fixed to the under faces of the wings by means of brackets 17, and the outer of these brackets 17 serves to limit the movement of the collars when the extensions are fully projected.

Furthermore, the outward movement of the extensions is limited by fixed flanges 19 on the wings, which are disposed inwardly at an angle and are engaged by tongues 20 on the upper portions of the extensions likewise at an angle, so that these parts 19 and 20 form an effectual interlock to brace the extensions as well as limit their outward movement.

It will thus be noted that the operator can, by turning the handwheel 18, cause the extensions 3 to be projected or withdrawn, and the degree of projection can of course be varied to suit conditions.

I have not attempted to indicate any sizes or proportions of the several parts and this is of course well within the scope of the invention, and I do not wish to limit myself to the specific details set forth but consider myself at liberty to make such changes and alterations as fairly fall within the spirit and scope of the appended claim.

I claim:

In combination with an airplane, of extensions on the ends of the airplane, means for moving the extensions inwardly, posts depending from the extensions, rods longitudinally positioned under the wings, collars mounted on the rods, members connecting the collars with the outer portions of the extensions and engaging the posts at their intermediate portions, and means for limiting the outward movement of the collars.

ABRAM A. ANDERSON.